Feb. 2, 1960    B. GEIER ET AL    2,923,253
TIE PULLERS

Original Filed March 28, 1952    8 Sheets-Sheet 1

Fig. 7

Inventors
Bernard Geier
John P. Hiltz, Jr
by Parker & Carter
Attorneys

Feb. 2, 1960     B. GEIER ET AL     2,923,253
TIE PULLERS Original Filed March 28, 1952     8 Sheets-Sheet 7

Inventors
Bernard Geier
John P. Hiltz, Jr
by Parker & Carter
Attorneys

Feb. 2, 1960   B. GEIER ET AL   2,923,253
TIE PULLERS
Original Filed March 28, 1952   8 Sheets-Sheet 8

Inventors
Bernard Geier
John P. Hiltz, Jr
by Parker & Carter
Attorneys

United States Patent Office 2,923,253
Patented Feb. 2, 1960

2,923,253

TIE PULLERS

Bernard Geier, Scranton, Pa., and John P. Hiltz, Jr., Albany, N.Y.

Continuation of abandoned application Serial No. 279,162, March 28, 1952. This application April 16, 1956, Serial No. 578,398

2 Claims. (Cl. 104—9)

Our invention relates to an improvement in tie handling machines, and has for one purpose to provide a machine of maximum flexibility which can remove old ties from beneath the rails, and can insert new ties, and can otherwise serve for handling and moving material useful in connection with work on railroad tracks.

One purpose is to provide means for readily withdrawing ties outwardly from beneath the rails of a track, by applying tension to the ties.

Another purpose is to provide means for tensionally drawing new ties inwardly beneath the rails of a track.

Another purpose is to provide effective means whereby an operator may guide a tie to proper position as it is being tensionally drawn beneath the rails of a track.

Another purpose is to provide a tie handling device which can be used for conveying, delivering, and stacking ties and other equipment.

Another purpose is to provide an improved boom or hoist structure for track working equipment.

Another purpose is to provide a conversion unit which permits a given boom to be employed alternatively to pull a tie outwardly from beneath the rails of a track and to pull a tie inwardly into rail supporting position beneath the rails of a track.

Another purpose is to provide an improved mast and boom assembly for tie handling machines and the like.

Another purpose is to provide improved driving and propelling means for such a device.

Another purpose is to provide an improved manually controllable tool for directing a tie for movement inwardly to a position beneath the rails of a track.

Another purpose is a new and improved method of withdrawing and inserting ties from the same side of the track.

Another purpose is to provide a self-contained assembly, including a boom-carrying car having conveying means and a working car adapted, for example, to receive ties removed from beneath rails or ready for insertion beneath rails.

Other purposes will appear from time to time in the course of the specification and claims.

The present application is a continuation of our application Serial No. 279,162, filed in the United States Patent Office on March 28, 1952, and now abandoned.

The invention is illustrated more or less diagrammatically in the accompanying drawings wherein.

Like parts are indicated by like symbols throughout the specification and drawings.

Referring to the drawings, 1, 1 illustrate the rails of a track and 2 the ties upon which the rails rest. It will be understood that the ties may be individually removed and inserted. Before removal, it will be understood that a tie is disconnected from the rails by the removal of whatever screws or spikes are employed to secure the rails to the tie. Such a free tie, in course of removal, is shown at A in Figure 2. A fresh tie in course of insertion is shown at B in Figure 1. A load of ties which are being conveyed along the track for insertion or for transporting after removal is illustrated at C in Figure 3.

Figure 4:
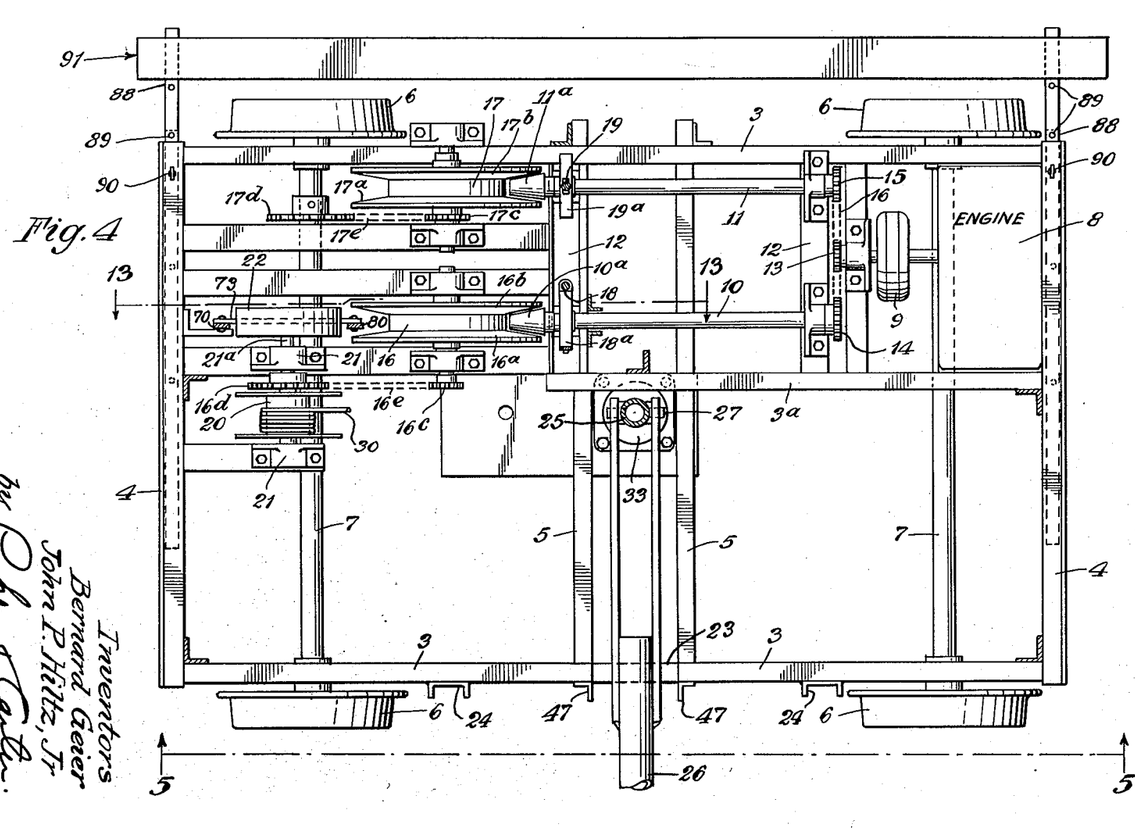
Figure 4 is a section on an enlarged scale on the line 4—4 of Figure 3, illustrating the boom in position as shown in Figure 2.

Referring to the actual structure, we may employ any suitable frame as shown for example in Figure 4, which may include longitudinal frame members 3, transverse end frame members 4 and transverse intermediate frame members 5. It will be understood that the details of the frame may be widely varied without departing from the spirit of our invention. The frame is movably supported on the rails for example by flanged wheels 6 on any suitable axles 7. 8 generally indicates an engine or suitable power plant, the details of which do not of themselves form part of the present invention.

Any suitable transmission or gear reduction or fluid coupling 9 may be employed for driving parallel shafts 10, 11 suitably journaled in the frame structure, for example on cross pieces 12, which may extend between one of the side frame members 3 and the intermediate longitudinally extending frame member 3a. The shaft 10, 11 may be driven, preferably continuously, by the engine 8 through the transmission or gear reduction 9 through any suitable sprockets 13, 14, 15 about which may pass any suitable driving chain or flexible drive element 16. The driven shafts 10, 11 are provided at their opposite ends with driving cones 10a and 11a respectively, which extend into the channels formed in the intermediate clutch members 16 and 17. As shown in Figure 4, the channeled clutch members are both indicated in neutral position with the conic members 10a and 11a out of operating contact with either side of either of the channeled clutch members.

Any suitable means for hand clutching may be employed. For example an actuating lever 18 may be employed to move the bearing block 18a of the shaft 10 to engage the cone 10a selectively with one or another of the two flanges 16a or 16b of the channeled member 16. The block 18a is shown as pivoted, as at 18b, on the cross-member 12. Similarly, the actuating lever 19 may be employed to move the bearing block 19a to urge the cone 11a to contact with the flange 17a or 17b of the channeled clutch member 17. The block 19a may be pivoted similarly to the block 18a. In the form of the device as shown, the channeled clutch 17 is connected by sprockets 17c, 17d and the chain 17e with one of the axles 7. Thus when the lever 19 is moved in one direction, the entire device is driven along the rails in a predetermined direction, while a reverse movement of the lever 19 over to the neutral position drives the device in an opposite direction on the rails. The neutral position in which the parts are shown in Figure 4 leaves the device stationary on the rails. If desired, any suitable braking means may be employed. It will be understood that the levers 18, 19 may be suitably biased or positively urged or otherwise positioned in neutral position in such fashion that a definite voluntary movement by an operator is necessary in order to drive the device in either direction.

The lever 18 is similarly used to drive the channeled clutch member 16 in one direction when the flange 16a is engaged and in the opposite direction when the flange 16b is engaged. When the member 16 is rotated, it is effective through sprockets 16c, 16d and the chain 16e to drive the hoist drum 20 which is suitably journaled in bearings 21 suitably mounted upon the base frame formed by the various structural elements 3a and 4 and their associated intermediate structural elements. Since the base frame may be made in a variety of ways, the transverse and longitudinal intermediate members need not be described in detail. If desired, any suitable brake drum 22 may be provided for the shaft 21a on which the drum 20 is mounted.

Figures 5, 6:
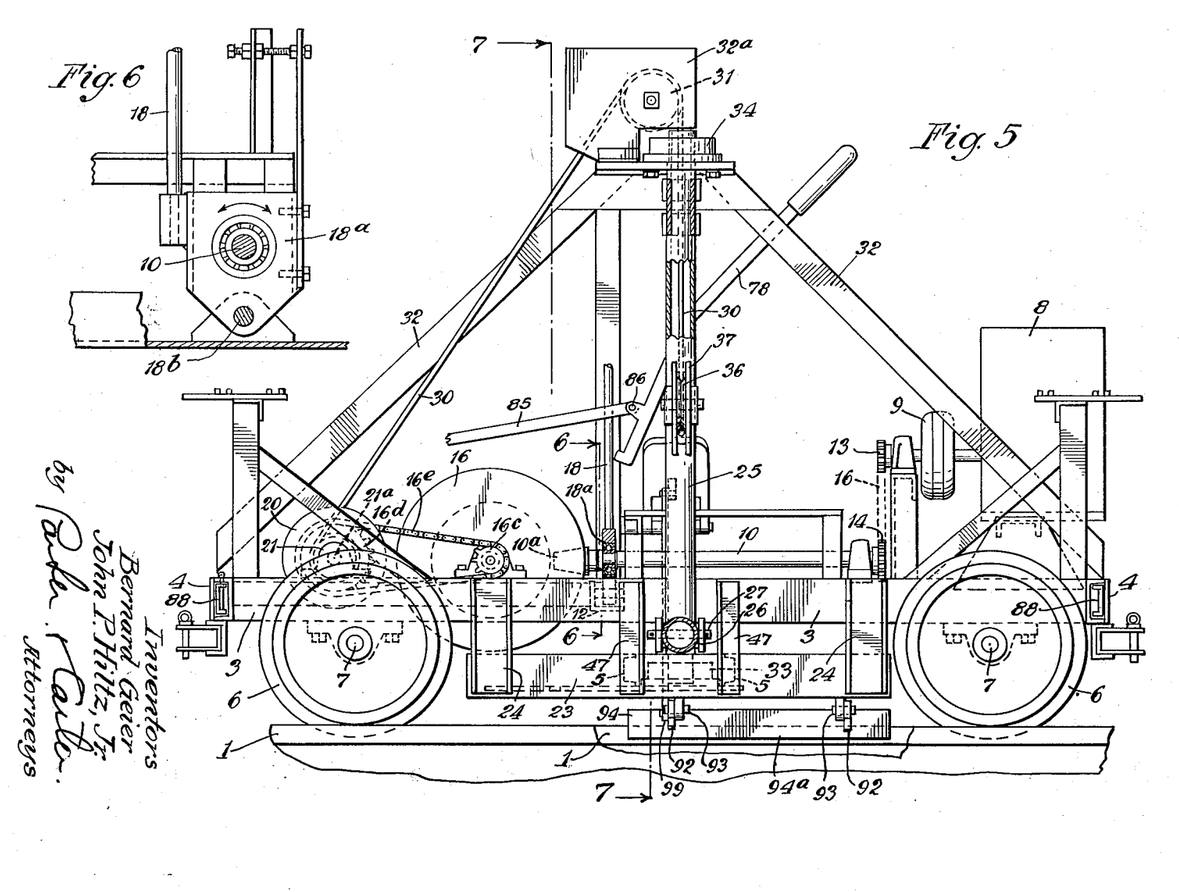
Figure 5 is a section on the line 5—5 of Figure 4, with parts broken away.
Figure 6 is a section on the line 6—6 of Figure 5.

We find it advantageous to provide a depending frame generally indicated at 23 for example in Figure 5, which includes suitable horizontal frame elements and vertical supporting elements 24. Rotatably mounted upon the depending frame is a hollow, vertical mast 25. Pivoted to the lower end of the mast is a tubular boom 26, the fork of which may be pivoted for example upon any suitable pivoting element or pin 27 as shown in Figure 5. It is preferably provided with a telescopic auxiliary inner boom element 26a which may be suitably held or adjusted in extended or withdrawn position, as by apertures 26b, as shown for example in Figure 2, into which a pin 26c may be inserted through a suitable aperture in the inner telescopic boom element 26a.

Figure 1:
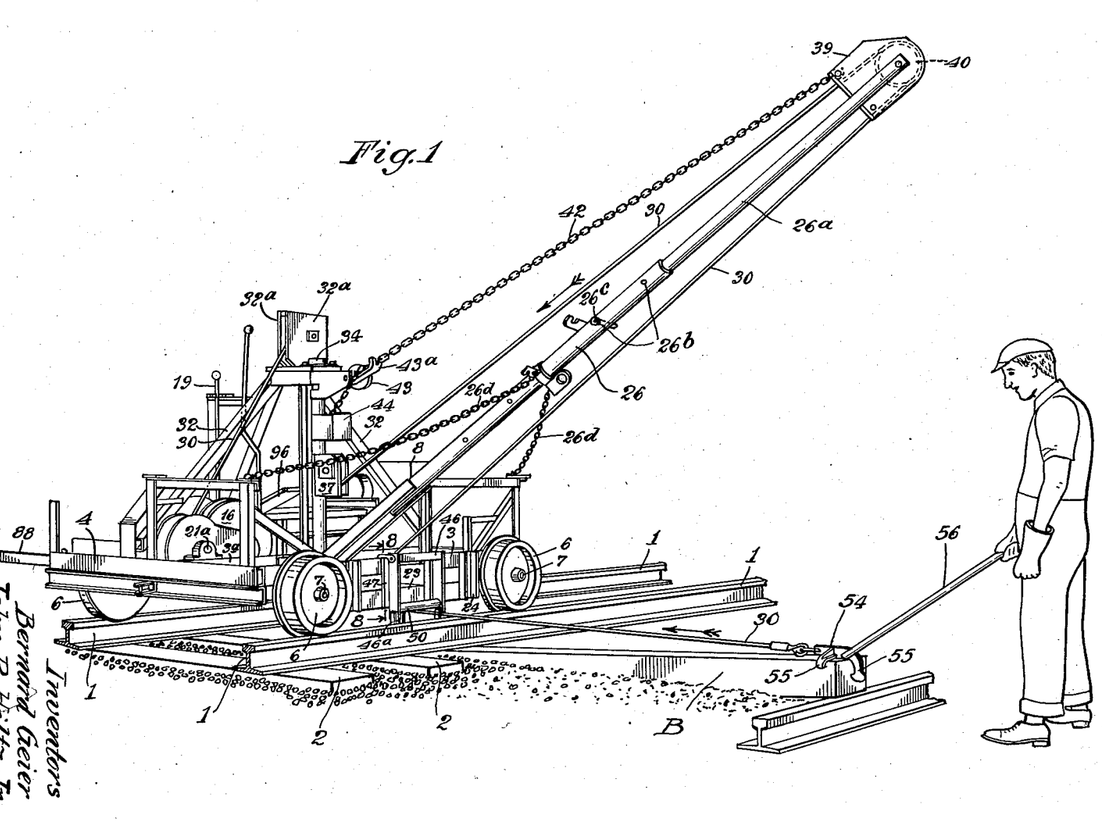
Figure 1 is a perspective view illustrating our device in position on a railroad track and adjusted and set to move ties inwardly beneath the rails of a track.
Figures 2, 11, 12:
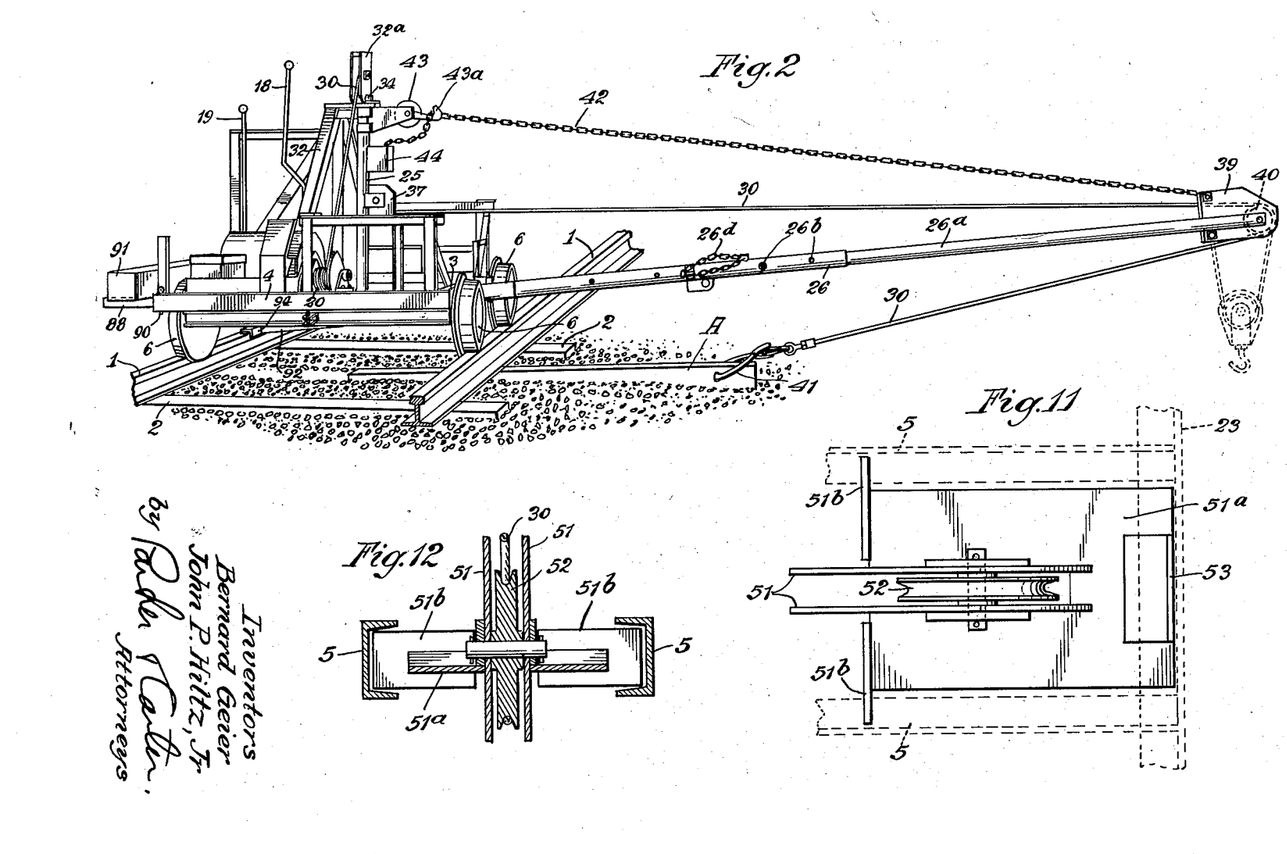
Figure 2 is a perspective view illustrating the device adjusted for the removal of ties outwardly beneath and away from the rails of the track.
Figure 11 is a plan view of another detachable member illustrated in working position in Figure 8.
Figure 12 is a section on the line 12—12 of Figure 8.
Figure 3:
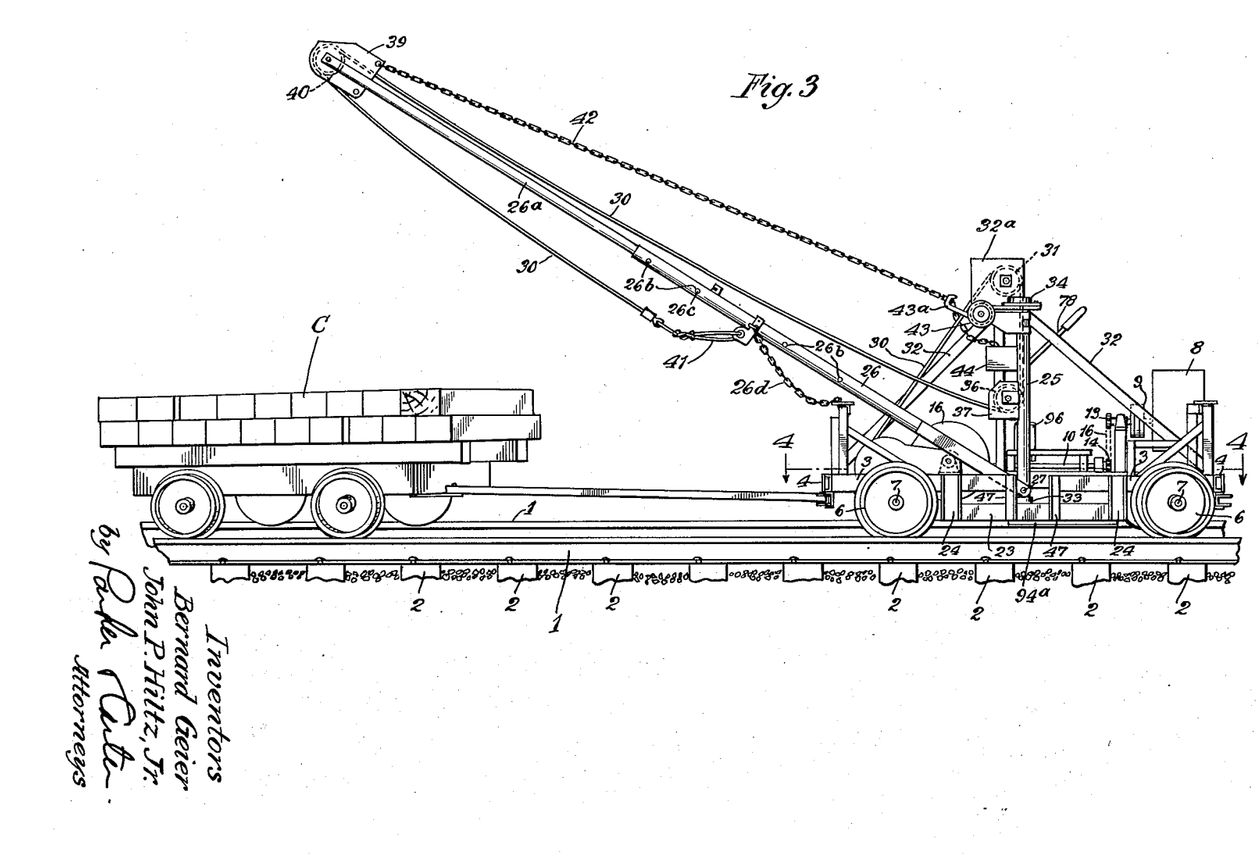
Figure 3 is a side elevation illustrating the device in position for movement along the track and illustrating it as drawing a trailer on which ties have been stacked.

The cable 30 from the drum 20 passes over the sheave 31, as shown for example in Figure 5, and extends downwardly through the open top of the hollow mast 25. As will be clear from Figure 5, the mast is rotatably mounted in a lower bearing member 33 and in an upper bearing member 34, the upper bearing member being mounted at the apex of any suitable mast supporting frame, generally indicated at 32. The frame 32 also supports between plates 32a the sheave 31. The cable may pass out through an intermediate aperture 35 about a sheave 36 on any suitable bracket 37, mounted intermediate the upper and lower ends of the hollow mast 25. The cable may be selectively employed to perform various functions. In Figure 2 it is shown as passing about a sheave 40 on any suitable sheave block 39, which may be removably secured to the end of the boom member 26a. When ties are to be withdrawn from beneath the rails as shown in Figure 2, the cable 30 has secured to its outer end any suitable securing member or hook or tongs 41, which may be attached to a tie A for removal of the tie. Then if the cable is reeled in on the drum 20, by suitable clutch actuation, the boom having first been put in the generally horizontal position, as shown in Figure 2, the tie is outwardly withdrawn until it is entirely clear of the rails. The boom 26 and mast 25 may be swung to a wide variety of lateral positions with respect to the longitudinal axis of the machine proper. At any desired lateral position, chains or other suitable tension elements 26d extending between the boom and the hooks on the frame as shown in Figure 1 may be employed to hold the boom and mast in place, providing for selective positioning of the boom and mast with respect to the longitudinal axis of the machine. The boom may be supported in a suitable outwardly extending position, for example a generally horizontal position as shown in Figure 2, by use of the securing chain or other suitable tension member 42, the inner end of which may be secured to any suitable hook or holding member 43a, mounted on or adjacent the upper end of the hollow mast 25 as on sheave 43. The loose chain end may be received in any suitable chain box or other receptacle 44. The boom 26 may be raised by reeving cable 30 about a sheave 43 on the mast 25 and fixing the end of the cable to the outer end of the boom.

In order to tensionally draw ties beneath the rails, we provide a removable cable guiding structure indicated generally at 46, which may be conveniently positioned between the channel members 3 and 23 on the main frame. Depending members 46a may be fixed to the removable frame 46 and having bearing engagement as at 46b with the track 1 on which the frame moves. The removable cable guiding structure includes bearing blocks 48 insertable between the two frame members 3 and 23, adjacent angle members 47, and hooks 49, or other suitable securing means movably mounted on the frame 46, which engage the longitudinal frame members 3 to hold the removable frame 46 in its operative position.

The frame member 46 carries a roller or cylindrical bar 50 adapted to guide the cable 30. A removable sheave block 51 carrying a pulley 52 is adapted for removable positioning and alignment adjacent the removable frame member 46. A frame element 51a may be fixed to the sheave block 51 and have an end portion 53 in supporting the positioning relationship to the longitudinally extending frame memebr 23. Fixed to the other end of the frame element 51a is a pair of longitudinally extending plates 51b which are positioned and supported by the channel members 5 of the main frame as illustrated in Figures 8 and 12.

Figures 8, 9:
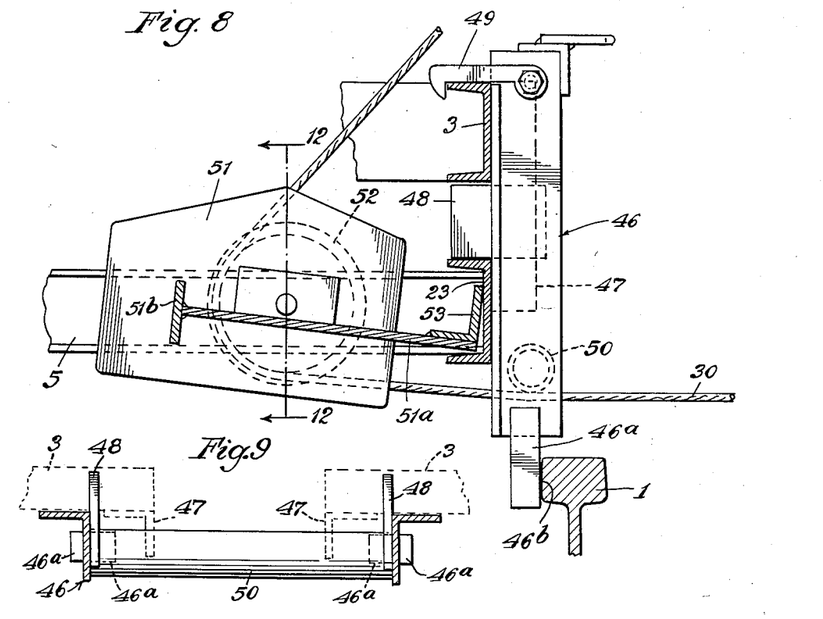
Figure 8 is a section on an enlarged scale on the line 8—8 of Figure 1.
Figure 9 is a section on the line 9—9 of Figure 10.
Figure 10:
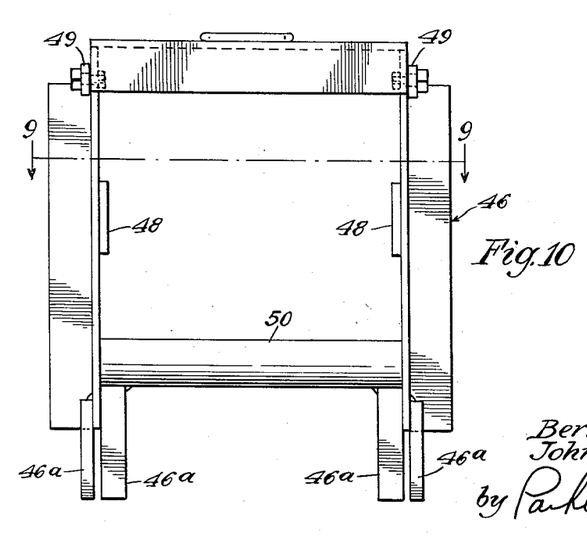
Figure 10 is a plan view of the detachable structure shown in position in Figures 8 and 1.

When it is desired to employ the boom and cable for positioning ties beneath the rails from which they have been removed, the frame guiding structure 46 and the sheave block 51 are positioned on the main frame intermediate the supporting wheels 6 as illustrated in Figure 1 and the cable 30 is then reeved about the pulley 52, as shown in Figure 8, and extended outwardly. Fixed to the end of the cable 30 is a tie pushing element 54 having depending hook members or gripping means 55 adapted for engagement with the end of a tie B. A handle 56 may be secured to the tie pushing or gripping element 54, so that an operator may readily manipulate the gripping element 54 and accordingly guide a tie into its proper position beneath the rails. In the use of the hoist unit for positioning ties beneath the rails shown in Figure 1, tension is applied to cable 30 in the direction of the arrows shown in Figure 1, and the cable and the tie pushing element push the tie into position beneath the rails.

Figure 14:
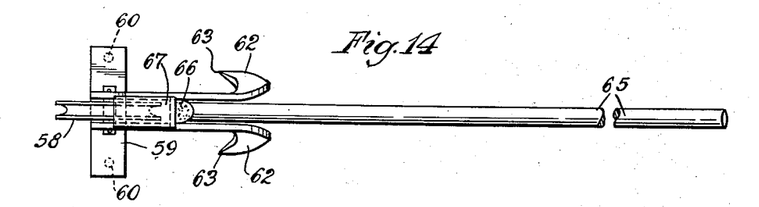
Figure 14 is a plan view of a variant form of tool for manually guiding a tie inwardly beneath the rails of a track as illustrated in Figure 1.
Figure 15:
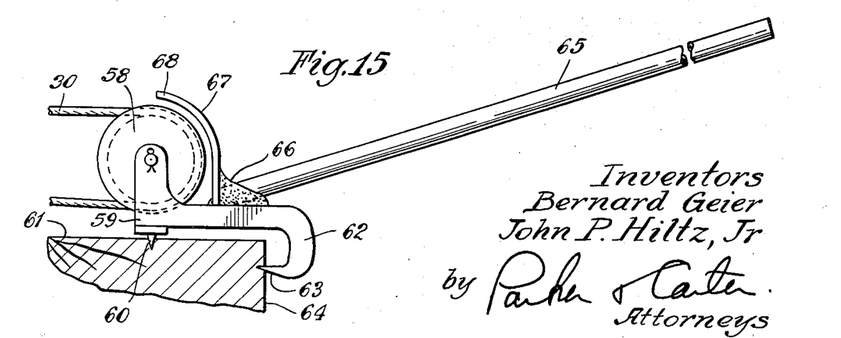
Figure 15 is a side elevation of the device illustrated in Figure 14.

In Figures 14 and 15, we show a form of implement designed to be operated by the cable 30 of the hoist unit for moving ties into place underneath the rails of a track when a relatively greater amount of power is required. In this form of the invention, the cable 30 is reeved about a pulley 58 rotatably mounted on a tie gripper indicated generally at 59. The tie gripper 59 includes depending spikes 60, or other suitable means adapted to grip the top face 61 of a tie. Depending transversely spaced hook members 62, which have pointed portions 63 extending in the direction of the cable and toward the main frame, are adapted to engage the end of a tie 64. The tie gripper 59 includes a handle 65, preferably welded as at 66 to the body portion of the tie gripper 59, and extended outwardly from the body portion. A cable guard 67 is positioned on the body portion of the tie gripper 59 and is provided with an arcuate portion 68 following the curvature of the pulley 58. It will be apparent that the cable guard thus positioned serves to prevent the operator of the tie gripper from getting his hands fouled in the cable and pulley assembly.

Figure 13:
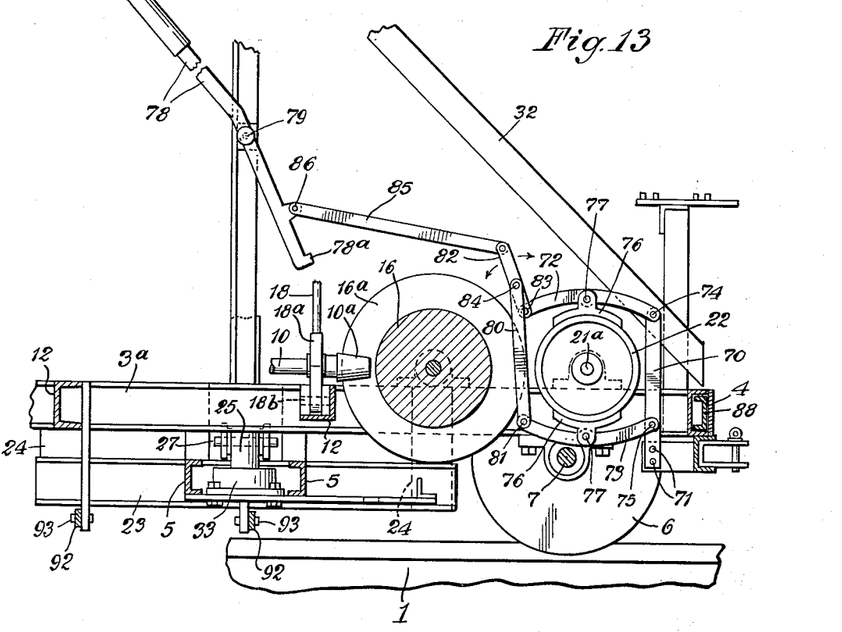
Figure 13 is a partial section on the line 13—13 of Figure 4.

We employ a hand-actuated brake structure for the cable drum 20, as shown in Figure 13. Fixed on the shaft 21a is a brake drum 22 coaxial with the cable drum 20. An upstanding brake shoe supporting member 70 is suitably secured to the main frame by means of any suitable means, such as bolts, rivets, or the like as at 71. Diametrically spaced with relation to the brake drum 22 are a pair of brake shoe supporting members 72 and 73 respectively. These brake shoe supporting members are pivotally mounted on the upstanding member at 74 and 75. A brake shoe 76 is pivotally mounted on each supporting member 72 and 73 respectively as at 77. It will be understood that as the brake shoe supporting members 72 and 73 move toward or away from the brake drum 22, the brake shoes 76 will move into or out of frictional engagement with the brake drum 22, and thus serve to apply braking pressure to the drum 22 and accordingly the cable drum 20. The brake shoes are adapted to be actuated by a manual control handle 78 pivotally mounted at 79 on an upstanding portion of the main frame. A link 80 is pivotally connected to one of the brake shoe supporting members 73, as at 81, and another link 82 is pivotally connected to the other brake shoe supporting member 72 at 83. The two links 80 and 82 are pivotally connected, as at 84. As the control link 82 is swung in the direction of the arrows, indicated in Figure 13, about pivot 83, link 80 will be moved toward or away from the pivot point 83, thereby expanding or contracting the brake shoe supporting members 72 and 73. The manually actuated handle 78 is connected at 86 to the control link 82 by means of a lever 85. A stop member 78a is formed on the end of control lever 78 and is adapted to abut lever 85 to limit movement of the control handle or lever 78 with respect to the lever 85. When the stop 78a contacts the lever 85, the link 80 and control link 82 will be in approximately straight line position, thereby forming a toggle lock for the brake shoe supporting members 72 and 73. When it is desired to release the brake, control handle 78 is swung clockwise on its pivot 79, thereby breaking the toggle formed by the members 80 and 82 and releasing the brake shoes 76.

In order to counterbalance the machine when the boom is applied to a heavy load, we provide an extensible counterbalance structure for the machine. This structure is formed on the side of the machine opposite to that side from which the boom extends and includes a pair of extensible bars 88. These bars are received within the frame members 4 for sliding movement with respect thereto. Each of the bars may be provided with suitable apertures 89 for reception of a locking pin 90 extending through the frame members 4. Any suitable counterweight carrying structure 91 may be supported on the extensible bars 88. Thus when the boom is in the position indicated in Figure 4 and a relatively heavy load is carried by the boom, the extensible bars 88 may be extended, as illustrated in dotted lines, and a suitable counterweight, such as a railroad tie, may be positioned thereon to oppose the tendency of the machine to tip in the direction of the boom.

In order to stop the machine and hold the machine in position along the track with respect to the track, we employ a foot pedal operated brake structure. This brake structure includes a brake shoe carrying member 92 pivoted about an axis 93, extending generally parallel with the track and in a plane generally parallel to the general plane of the base of the machine. A brake shoe attaching member 94, extending parallel to the track rail intermediate the front and rear wheels of the machine, is carried by the supporting member 92. As shown the member 94 includes a depending portion 94a adapted to abut against the side of a rail of the track. The depending portion 94a is adapted to abut against the track rail and resist side thrust of the machine when the cable is being reeled in about the drum 20. A suitable brake shoe 95 is fitted to the underside of the brake shoe attaching member 94. When the brake shoe carrying member 92 is swung about the axis 93, the brake shoe will be moved into and out of engagement with the track rail, providing a convenient means for stopping the machine and holding the machine in place with respect to the track rail.

A brake actuating member 96 is pivoted to the operator platform 97 at 98. A connecting link 99 is pivoted to the actuating lever 96 at 100 and at its other end to the brake shoe carrying member 92 at 101. As lever 96 is swung clockwise about its pivot 98, the connecting link 99 will force the brake shoe carrying member 92 counter-clockwise and force the brake shoe 95 into engagement with the track rail 1. The actuating lever 96 is positioned on the operator platform so that the operator may conveniently actuate the brake while the machine is traveling along the rails or when the boom is in use. A spring 102, secured to the lever 92 as at 103 and at its other end to the frame member 12 as at 104, normally holds the brake shoe 95 in inoperative position as illustrated in Figure 6.

Figure 7:
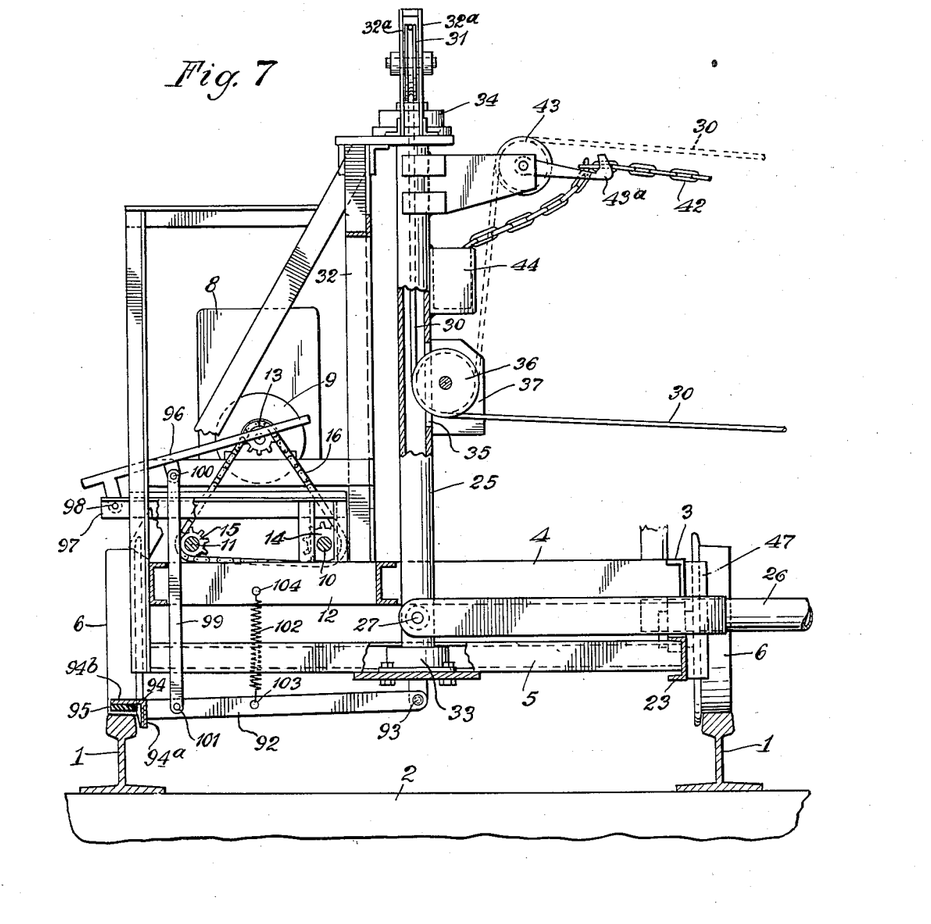
Figure 7 is a section on the line 7—7 of Figure 5.

The use and operation of our invention are as follows:

The track working machine described and illustrated is relatively light in weight and yet, at the same time, is adapted for a wide variety of track working operations. The invention utilizes the principle of transferring reactive thrusts developed in the cable mechanism to the track rails themselves. Thus the invention takes advantage of the relatively heavy and stable structure formed by the track rails in carrying out working operations with the cable 30. When the cable 30 is employed to pull a tie from beneath the track rails the reactive thrust on the boom 26a is transferred through the abutment member 94a to the left-hand rail 1 illustrated in Figure 7. On the other hand, when the cable is reeved about the pulley 52 for use in moving a tie into position beneath the rails, the reactive pressure developed in the pulley 52 is transferred through the abutment 46a to the right-hand rail 1 illustrated in Figure 8.

The cable 30 extends from the cable drum to the top of the mast 25, is taken downwardly through the interior of the mast and is then led out around the pulley 36 to the boom 26. Thus, reactive thrusts developed on the pulley 36 are positioned at a relatively low point on the mast 25.

In using the invention to pull ties from beneath the rails a grapple is affixed to the end of the cable 30 and the user of the invention simply affixes the grapple to the end of the tie and actuates the hoist so that the grapple and tie are pulled outwardly from the rails. On the other hand, when the invention is used to insert ties beneath the rails, the cable 30 is reeved about the pulley 52 on the guide structure 46. The tie gripping and grinding tool 54 is applied to the end of the tie as is illustrated in Figure 1 and the hoist is then actuated to draw the end of the cable 30 inwardly and move the tie into position.

It should be noted that with the use of the pulley 52 and guide structure, the boom and hoist gear are readily adapted for use either as a tie withdrawing operation or a tie inserting operation.

A point of major importance is the provision of the cable guide which guides the cable 30 inwardly toward the rails in a generally horizontal movement at the general level of the rails. This enhances the transfer of reactive thrusts to the rails themselves and uses a maximum amount of the pulling force exerted on the cable 30 in the tie inserting operation.

While we have shown and described a preferred form of our invention, we wish it to be understood that the machine shown and described herein is to be taken in an illustrative or diagrammatic sense and that the machine is capable of many modifications within the spirit of our invention and we therefore wish our invention to be limited only as defined by the hereinafter appended claims.

The tie handling implement illustrated in Figure 15 is particularly advantageous in the tie inserting operation. The operator, by suitably moving the upwardly inclined handle 65 up and down or to one side, can move the tie up and down or to one side, and thus "steer" the tie into position beneath the rails.

We claim:

1. In a machine for both inserting and withdrawing ties from beneath railroad track, a base to move along the rails, a cable for the base, power means mounted on the base for drawing in the cable, the cable being connected to the power means, a boom extending transversely and pivoted on the base about a horizontal axis and adapted to be disposed generally in a horizontal position adjacent the level of the track during tie withdrawal and in a raised position on the same side of the base and substantially above the level of the track during tie insertion, the boom's outer end extending outwardly from the track a distance greater than a tie length, connecting means at the outer end of the cable for connecting the cable to a tie, guide means on the base and second guide means on the outer end of the boom for guiding the cable outwardly about the outer end of the boom and then inwardly to a tie at least during tie withdrawal so that the force on the tie from the cable will be generally horizontally outwardly and generally at the level of the track during tie withdrawal, and a pulley mounted on the same side of the base from which the boom extends and adjacent the level of the track, the cable being passed about the pulley during tie insertion for guiding the cable outwardly to the tie so that the force on the tie from the cable will also be generally horizontal and generally at the level of the track during tie insertion but in the opposite direction so that ties may be either inserted or withdrawn on the same side of the track.

2. A method of operating a track machine for both inserting ties under and withdrawing ties from beneath railroad track, the ties being both inserted and withdrawn on the same side of the track, the machine including a boom mounted for pivotal movement thereon, a cable and power means mounted on the machine for drawing in the cable; including the steps of disposing the boom, during tie insertion, generally in a horizontal position to one side of the machine on the side of the track from which the tie is to be withdrawn and generally at right angles to the track, positioning the machine so that the inner end of the boom on the machine is generally adjacent the tie to be withdrawn, passing the cable outwardly about the outer end of the boom, returning the cable inwardly from the outer end of the boom, attaching the cable to the projecting end of the tie to be withdrawn, and actuating the power means to draw the cable in to the machine about the outer end of the boom so that the portion of the cable attached to the tie to be withdrawn will move ouwardly toward the outer end of the boom thereby withdrawing the tie from beneath the rails on the said side of the track, and, during tie insertion from the same side of the track, pivoting the boom so that it will be out of the way, passing the cable on an alternate path through a guide on the same side of the machine adjacent track level, passing the cable outwardly on the same side of the track from the guide on the machine, attaching the cable to one end of a tie to be inserted, actuating the power means so that the cable will be drawn in, and, while the cable is being drawn in, guiding the tie so that the end of the tie to which the cable is not attached will be inserted first.

References Cited in the file of this patent

UNITED STATES PATENTS

| | | |
|---|---|---|
| 124,749 | Koontz | Mar. 19, 1872 |
| 137,737 | Tillson | Apr. 8, 1875 |
| 1,034,072 | Bury | July 30, 1912 |
| 1,186,002 | Jones | June 6, 1916 |
| 1,291,746 | Bradney et al. | Jan. 21, 1919 |
| 1,466,851 | Owen | Sept. 4, 1923 |
| 1,488,040 | Galland | Mar. 25, 1924 |
| 1,613,037 | Kniffen | Jan. 4, 1927 |
| 1,666,857 | Hunt | Apr. 17, 1928 |
| 2,301,555 | Mantyla | Nov. 10, 1942 |
| 2,368,268 | Spiegel | Jan. 30, 1945 |
| 2,387,087 | Nelson | Oct. 16, 1945 |
| 2,735,375 | Hesemann | Feb. 21, 1956 |

FOREIGN PATENTS

| | | |
|---|---|---|
| 502,507 | Great Britain | Mar. 30, 1939 |
| 118,454 | Sweden | Mar. 26, 1947 |

OTHER REFERENCES

Nordberg Bulletin 201, published by Nordberg Mfg. Co., Milwaukee, Wisconsin, 1953, 2 pages.